United States Patent [19]

Nishibayashi

[11] Patent Number: 4,947,742

[45] Date of Patent: Aug. 14, 1990

[54] BEAN-CURD MANUFACTURING APPARATUS

[76] Inventor: Seitaro Nishibayashi, 2-36-1-910, Minamiohtsuka, Toshima-ku, Tokyo, Japan

[21] Appl. No.: 379,984

[22] Filed: Jul. 14, 1989

[30] Foreign Application Priority Data

Sep. 30, 1988 [JP] Japan ............................. 63-246540

[51] Int. Cl.⁵ ........................... A23C 3/02; A23J 1/00; A23L 1/20
[52] U.S. Cl. ...................................... 99/483; 99/453; 99/472; 99/484; 99/510; 99/516
[58] Field of Search ................ 99/516, 519, 568, 484, 99/538, 472, 483, 469, 600, 601, 495, 452–455, 510–513; 426/431, 464, 486, 482

[56] References Cited

U.S. PATENT DOCUMENTS

| | | | |
|---|---|---|---|
| 3,871,273 | 3/1975 | Hsieh | 99/323.3 |
| 4,175,482 | 11/1979 | Kumagaya | 99/516 |
| 4,245,553 | 1/1981 | Nakamura | 99/628 |
| 4,534,283 | 8/1985 | Nakamuta | 99/468 |
| 4,664,924 | 5/1987 | Sugisawa et al. | 426/242 |
| 4,771,681 | 9/1988 | Nagata | 99/483 |
| 4,813,347 | 3/1989 | Yoshida | 99/453 |

Primary Examiner—Timothy F. Simone
Attorney, Agent, or Firm—Tarolli, Sundheim & Covell

[57] ABSTRACT

Disclosed is a tofu manufacturing apparatus. The tofu manufacturing apparatus comprises a raw material tank containing soybean powder, a soy milk generator vessel connected to the raw material tank, a soy milk boiling caldron connected to the soy milk generator vessel, a suction means to suck boiling soy milk from the soy milk boiling caldron, a control container receiving soy milk from the suction means, and a tofu forming tank receiving soy milk from the control container.

6 Claims, 2 Drawing Sheets

BEAN-CURD MANUFACTURING APPARATUS

BACKGROUND OF THE INVENTION

1. Technical Field

The present invention relates to an improvement of a bean-curd manufacturing apparatus.

2. Prior Art

Simply stated, tofu (bean-curd) is made by hand in such a way that soy milk made from soybean powder is squeezed from a bag to separate tofu refuse, and the refined soy milk is boiled and fed into a tub and then a coagulation agent is and and mixed into form tofu.

As stated, tofu has conventionally been made by hand. However, such a manual, operation is troublesome and the tofu so manufactured is not always of good quality as the temperature and quantity of soy milk and the ratio of coagulation agent to soy milk is not by always precise. Further, as skill is necessary, the unit price of tofu is high.

Recently, mechanical tofu manufacturing apparatus have been proposed. However, such known proposals only partially mechanize the operation; or devices for operations are not integrated and the connections between the devices are performed manually. Thus, known tofu manufacturing apparatus are far from sufficient.

Accordingly, the object of the present invention is to provide an improved tofu manufacturing apparatus which eliminates the above-mentioned disadvantages and is practical and can be used efficiently.

SUMMARY OF THE INVENTION

The tofu manufacturing apparatus, according to the present invention comprises a raw material tank containing soybean powder, a soy milk generator vessel connected to a raw material tank, a soy milk boiling caldron connected to a soy milk generator vessel, a suction means to suck boiled soy milk from the soy milk boiling caldron, a control container receiving soy milk from the suction means, and a tofu forming tank receiving soy milk from the control container.

As described, in the tofu manufacturing apparatus, according to the present invention, soybean powder contained in the raw material tank is fed into the soy milk generating vessel to form soy milk, and the soy milk is boiled in the soy milk boiling caldron and the boiled soy milk is fed into the control container through the suction means, and further, the soy milk is fed from the control container to the tofu forming tank in which tofu is formed. Thus, by use of the apparatus, the operations from the raw material to the final product are performed continuously and automatically.

BRIEF DESCRIPTION OF THE DRAWINGS

Embodiments of the tofu manufacturing apparatus, according to the present invention, will be described fully referring to the accompanying drawings, by way of example, in which.

DETAILED DESCRIPTION OF THE INVENTION

Figure 1:
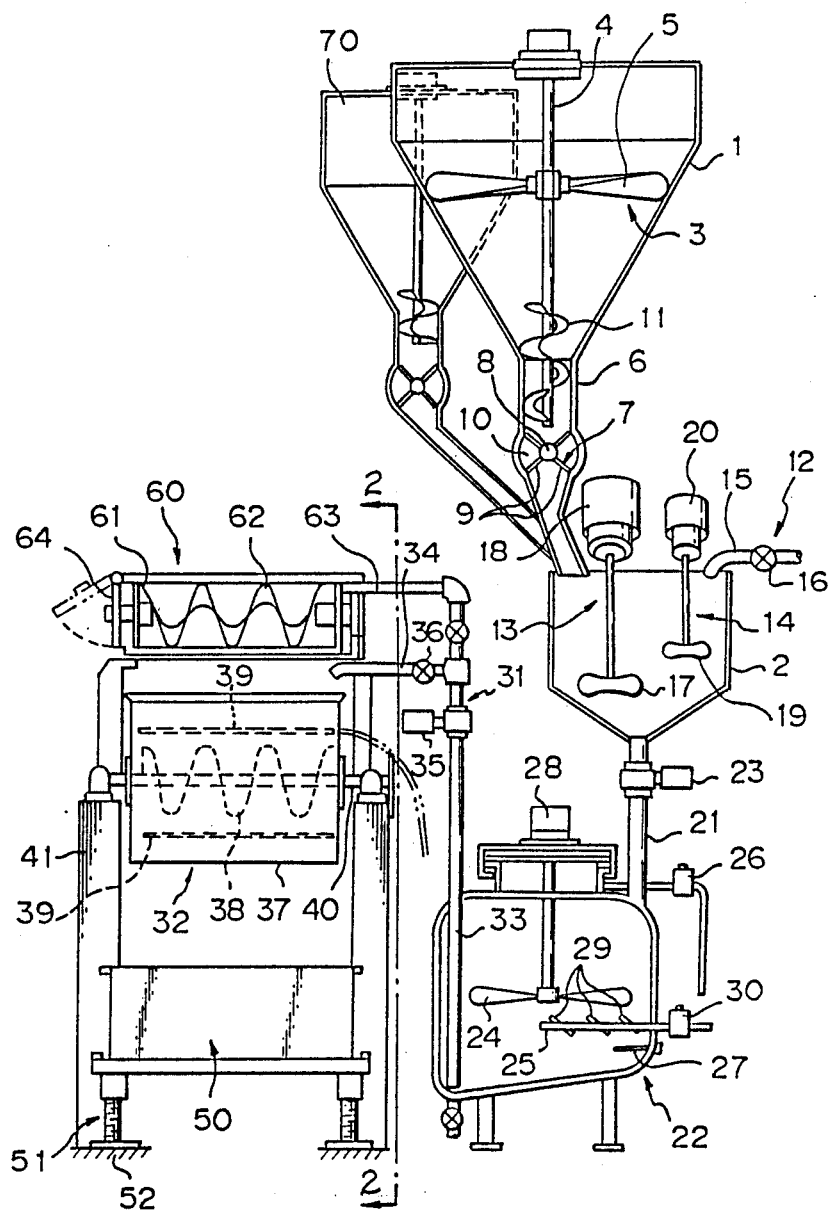
FIG. 1 shows a schematic construction of a tofu manufacturing apparatus, according to the present invention.

Referring to FIG. 1, a tofu manufacturing apparatus, according to the present invention, includes a raw material tank 1 which receives soybean powder which is the raw material of tofu, and a soy milk generating vessel 2 which is connected to the tank 1.

A scraper 3 is arranged in the raw material tank 1 and includes a shaft 4 extending vertically into the center of to tank 1 and blades 5 secured with the shaft 4. The upper end of the shaft 4 is rotatably mounted in an upper wall of the tank 1. The scraper 3 stirs the soybean powder in the tank 1 to prevent the cohesion of the powder and to prevent any adhesion of the powder to the tank wall.

The raw material tank 1 and the soy milk generating vessel 2 are connected by a connecting pipe 6 in which is inserted a metering valve 7 which in the illustrated embodiment, includes a rotating shaft 8 supported in the connecting pipe 6 and plurality of blades 9 mounted to the shaft 8. Between the blades 9 a metering chamber 10 is formed to meter the soybean powder in the tank 1 and to feed the metered quantity of powder to the soy milk generating water vessel 2. A filling blade 11 is mounted at the lower end of the scraper shaft 4 to stir the soybean powder at a lower portion of the tank 1 and to assist the smooth feeding of the powder into the metering valve 7.

The soy milk generating vessel 2 generates soy milk from the soybean powder fed from the tank 1. The soy milk generating vessel 2 has a water supply means 12 and a first and second mixers 13 and 14. The water supply means includes a water supply pipe 15 is which is inserted an automatic control valve 16.

The first mixer 13 and the second mixer 14 are similar in the illustrated embodiment and differ only in size. The first mixer 13 has large mixing blades 17 and a drive means 18 to drive the blades, and the second mixer 14 includes small mixing blades 19 spaced from the blades 17 and a drive means 20 to drive the blades 19. The drive means 18 and 20 are electric motors. The rotation of the small mixer blades 19 is faster than that of the large blades to obtain thorough stirring and soy milk of a uniform consistency.

Suitable waater is supplied from the water supply means into the soybean powder in the soy milk generating vessel, and the powder and water are mixed by the first and second mixers to generate soy milk.

A boiling caldron 22 is connected to the soy milk generating vessel 2 through a connecetor pipe 21 in which is inserted an electromagnetic valve 23 to control the soy milk supply into the caldron 22. The boiling caldron 22 includes mixer blades 24, a steam injection nozzle means 25, an air exhaust valve 26 and a temperature sensor 27. The mixer blades 24 mix the soy milk in the caldron, and it is driven by a motor 28.

The steam injection nozzle means 25 includes a plurality of injection nozzles 29 and an electromagnetic valve 30 which controls the supply of steam of a suitable temperature into the caldron 22. The soy milk is boiled by the steam at a suitable temperature. The air exhaust valve 26 maintains pressure in the caldron 22 and vents excess air to the atmosphere.

Control means, not shown, is connected to the temperature sensor 27 and the a electromagnetic valve 30 and controls the electromagnetic valve 30 by a temperature signal from the temperature sensor 27 to maintain soy milk heating temperature in the caldron 22 at a constant level. The electromagnetic valve 23 and the air exhaust valve 26 may be controlled automatically by the control means.

The soy milk boiled in the caldron 22 is sucked through a suction means 31 into a control container 32. The suction means 31 includes a first suction pipe 33 which is inserted at one end into the caldron 22, a second suction pipe 34 connected to the first suction pipe 33 and extending upward from the control container 32, a pump 35 inserted in the first suction pipe 33 to suck the soy milk and a valve 36 inserted in the seocnd suction pipe 34.

The control container 32 includes a casing 37, a screw 38 in the casing 37 and cooling water circulation pipe means 39 in the casing 37. The casing 37 has a shaft 40 which is rotatably supported by support frames 41 at both ends.

Figure 2:
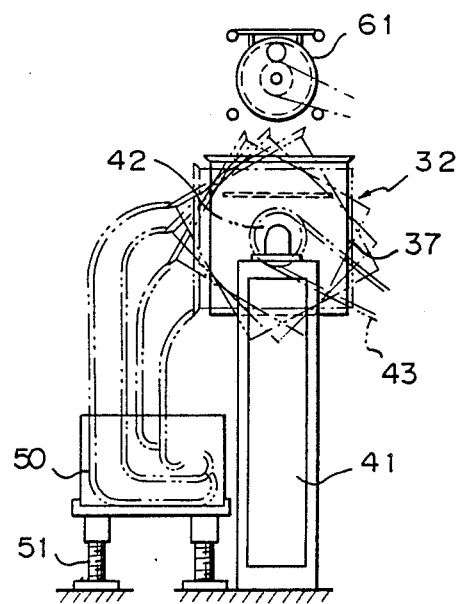
FIG. 2 is an end view along line 2—2 in FIG. 1.

The shaft 40 mounts a sprocket 42 shown in FIG. 2 which is driven by a chain 43 which in turn is driven by a motor, not shown, through a drive sprocket, not shown. Thus, by rotating the motor at an angle, the casing can be tilted at a suitable angle as shown by the chain line in FIG. 2. The motor is connected to a control circuit, not shown, which controls the rotation angle of the motor to control the inclination angle and the inclination speed of the casing 37.

A tofu forming tank 50 arranged downward from the control container 32 and is vertically, movably supported by elevator means 51 on a floor 52. Thus, the tank 50 can by approached to and spaced from the control container 32. The elevator means is a screw mechanism in the illustrated embodiment. The tank 50 contains a coagulation agent for forming tofu.

The boiled soy milk supplied from the boiling caldron 22 by the suction means 31 is cooled by heat exchange with the cooling water circulation pipe means 39 to a suitable temperature. Then, the control means tilts the casing 37 to drop soy milk into the tofu forming tank 50. The edge of the casing 37 has a recess for dropping the soy milk into the tank 50.

Soy milk dropped into the tofu forming tank 50 mixes with a coagulation agent in the tank 50 to from soy milk of a uniform consistency. Uniform mixing between the soy milk and coagulation agent is obtained by a vertical movement of the tank 50 and suitable setting of the rotation angle and speed of the control container 32. Specifically, according to the type of tofu to be manufactured, silky, coarse or soft, and the type of soy milk and coagulation agent, the rotation angle and speed of the control container and vertical position of the tank controlled. Accordingly, thus tofu of a desired quality can be manufactured.

A squeeze means 60 may be placed between the suction means 31 and the control container 32. The squeeze means 60 includes a rotatable squeeze cage 61 and a rotatable screw 62. The squeeze cage 61 has meshes on the outer wall, and is placed upward from the control container 32.

Soy milk is supplied into the squeeze cage 61 and is mixed by the screw 62 and drops into the control container 32 through the meshes of the squeeze cage 61. Strained lees is discharged from an outlet 64 at one end of the squeeze cage 61. Soy milk in the squeeze cage is squeezed by the screw 62 and refined soy milk is supplied to the control container 32, and refuse and soy milk block are charged from the outlet 64. The screw 62 comprises a belt-like helical fin which forms a central opening extending longitudinally. Thus, soy milk is squeezed sufficiently by the screw.

A mixing material tank 70 may be connected to the tofu generator vessel 2. The tank 70 may be similar to the raw material tank 1 except for the scraper 3. The tank 70 may contain fish powder or meal powder to be mixed with tofu, and feeds a predetermined quantity of the powder into the vessel 2.

Powder of green tea, desired spices, pellila or citron powder may be suitable mixed with tofu.

By the above-mentioned apparatus, soybean powder in the raw material tank is formed as soy milk in the tofu generator vessel 3, and the soy milk is boiled in the caldron 22 and is fed through the suction means 31 to the squeeze means 60 or the control container 32. Soy milk in the container 32 is fed to the tofu forming tank 50 and is coagulated by the coagulation agent in the tank 50 to form tofu.

As described in detail, the apparatus, according to the present invention, performs the tofu forming operation automatically and continuously. Further, each semi-product in the intermediate state is adequately controlled so that tofu of good quality can be made cheaply and without the skill of an operator.

What is claimed is:

1. A tofu manufacturing apparatus comprising a raw material tank containing soybean powder, a soy milk generator vessel connected to the raw material tank, a soy milk boiling caldron connected to the soy milk generator vessel, a suction means to suck boiled soy milk from the soy milk boiling caldron, a control container for receiving soy milk from the suction means, a squeeze means is disposed between the suction means and the control container, and a tofu forming tank for receiving soy milk from the control container.

2. A tofu manufacturing apparatus comprising a raw material tank containing soybean powder, a soy milk generator vessel connected to the raw material tank, an ingredient mixing tank containing the raw materials to be mixed with the tofu is connected to the soy milk generator vessel, a soy milk boiling caldron connected to the soy milk generator vessel, a suction means to suck boiled soy milk from the soy milk boiling caldron, a control container for receiving soy milk from the suction means, and a tofu forming tank for receiving soy milk from the control container.

3. A tofu manufacturing apparatus comprising a raw material tank containing soybean powder, a scraper mounted in the raw material tank, a soy milk generator vessel connected to the raw material tank, a soy milk boiling caldron connected to the soy milk generator vessel, a suction means to suck boiled soy milk from the soy milk boiling caldron, a control container for receiving soy milk from the suction means, and a tofu forming tank for receiving soy milk from the control container.

4. A tofu manufacturing apparatus comprising a raw material tank containing soybean powder, a milk generator vessel connected to the raw material tank, soy milk boiling caldron connected to the soy milk generator vessel, an induction blade mounted in the soy milk boiling caldron, a suction means to suck boiled soy milk from the soy milk boiling caldron, a control container for receiving soy milk from the suction means, and a tofu forming tank for receiving soy milk from the control container.

5. A tofu manufacturing apparatus comprising a raw material tank containing soybean powder, a soy milk generator vessel connected to the raw material tank, a soy milk boiling caldron connected to the soy milk generator vessel, a suction means to suck boiled soy milk from the soy milk boiling caldron, a control container for receiving soy milk from the suction means, said control container being controllably tiltable, and a tofu forming tank for receiving soy milk from the control container.

6. A tofu manufacturing apparatus comprising a raw material tank containing soybean powder, a soy milk generator vessel connected to the raw material tank, a soy milk boiling caldron connected to the soy milk generator vessel, a suction means to suck boiled soy milk from the soy milk boiling caldron, a control container for receiving soy milk fron the suction means, a squeeze means is inserted between the suction means and the control container, said squeeze means including a rotatable squeeze cage and a screw rotatably supported in the squeeze cage, and a tofu forming tank for receiving soy milk from the control container.

* * * * *

UNITED STATES PATENT AND TRADEMARK OFFICE
CERTIFICATE OF CORRECTION

PATENT NO. : 4,947,742

DATED : August 14, 1990

INVENTOR(S) : Seitaro Nishibayashi

It is certified that error appears in the above-identified patent and that said Letters Patent is hereby corrected as shown below:

Column 4, Line 53, Claim 4, insert --soy-- after ", a" before "milk".

Signed and Sealed this

Seventeenth Day of December, 1991

Attest:

HARRY F. MANBECK, JR.

*Attesting Officer*  *Commissioner of Patents and Trademarks*